Patented Sept. 18, 1945

2,384,973

UNITED STATES PATENT OFFICE 2,384,973

VINYLIDENE CHLORIDE COMPOSITIONS

Frank B. Smith, Midland, Mich., assignor to The Dow Chemical Company, Midland, Mich., a corporation of Michigan No Drawing. Application July 18, 1941, Serial No. 403,020

6 Claims. (Cl. 260—36)

This invention relates to thermoplastic compositions comprising polymeric vinylidene chloride products, modified with one or a combination of hydro-aromatic-substituted diaryl ethers having the general formula:

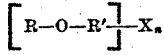

wherein R and R' each represent an aryl group selected from the class consisting of the phenyl, alkylphenyl, and naphthyl radicals, X is a hydro-aromatic radical selected from the class consisting of the cyclohexyl and hydrocarbon substituted cyclohexyl radicals, e. g. alkyl cyclohexyl, dicyclohexyl and aryl-cyclohexyl radicals and $n$ is an integer from 1 to 6, inclusive. Many of such compounds and ways in which they may be made are described in U. S. Patent No. 2,195,383.

As herein used, the term "polymeric vinylidene chloride product" includes the polymer of vinylidene chloride alone and other products, whether polymers, co-polymers, interpolymers, or otherwise named, which may be obtained by polymerizing together monomeric vinylidene chloride and one or more of the monomers of other polymerizable materials, such as vinyl chloride, vinyl acetate, vinyl ethers, acrylic and methacrylic acids and esters thereof, acrylic nitrile, butadiene, styrene, allyl chloride and the allyl, methallyl, crotonyl, 2-chloroallyl, or cinnamyl esters of mono and dicarboxylic acids. The polymer of vinylidene chloride alone is described in U. S. Patent No. 2,160,903 and many of its co-polymers and other polymerizable compounds, as well as certain plasticized compositions comprising these co-polymers, and ways in which the products may be made, are described in U. S. Patents, 2,160,904; 2,206,022; 2,215,379 and 2,160,931 to 2,160,948, inclusive.

According to the present invention, hydro-aromatic-substituted diaryl ethers of the type described are incorporated with polymeric vinylidene chloride products to produce a mass which can be molded or extruded at substantially lower temperatures and pressures than can the polymeric vinylidene chloride product alone, without at the same time unduly decreasing the tensile strength and hardness. In many instances the hydro-aromatic-substituted diaryl ethers have a plasticizing effect and produce masses which can be extruded to form threads, bands, foils, filaments, and the like which are highly flexible and which retain this high degree of flexibility over a wide range of temperature. Furthermore, incorporating hydro-aromatic-substituted diaryl ethers with polymeric vinylidene chloride products forms masses that are substantially more compatible with many of the commonly used lacquer solvents. Many of the compositions prepared according to the present invention can easily be molded or extruded to form articles that have a tough durable finish and which retain a resistance to chemicals typical of polymeric vinylidene chloride products.

The addition of the hydro-aromatic-substituted diaryl ethers of the type described to the polymeric vinylidene chloride product may be effected by any of several methods. For example, the polymeric vinylidene chloride product and the particular hydro-aromatic-substituted diaryl ether to be employed may be mixed or ground together in a ball mill or other suitable mixer commonly employed in the plastic art, or they may be added to the polymer on hot rolls in a method similar to compounding rubber compositions. Another satisfactory method of incorporating the hydro-aromatic-substituted diaryl ethers with the polymeric vinylidene chloride products is to dissolve the ether in a readily volatile solvent and mix or grind the materials in any suitable apparatus such as a ball mill, thereafter evaporating the solvent. To effect complete homogenization of the composition, it should preferably be heated to a fusion temperature.

The following examples illustrate the practice of the invention but are not to be construed as limiting the scope thereof:

Example 1

Cyclohexene was reacted with diphenyl ether in the presence of an alkylating catalyst to prepare a mixture of cyclohexyl substituted diphenyl ethers. After reaction was complete the catalyst was removed and the mixture was distilled under vacuum and separated into several fractions. One fraction of this material distilling at 273°–300° C. under 20 millimeters pressure and having a specific gravity of 1.0307 at 60°/60° C. and an index of refraction $$N_D^{25} = 1.5662$$

was a mixture corresponding approximately to dicyclohexyl diphenyl ether. 7.5 grams of this material were incorporated with 20 milliliters of acetone. To this solution was added 42.5 grams of a co-polymer consisting of 90 per cent vinylidene chloride and 10 per cent vinyl chloride. The mixture was ground until thoroughly blended and then dried. The composition could easily be molded or extruded and filaments, having a diameter of 0.023 inch, prepared from this material were tough flexible threads and had a tensile strength above 32,000 pounds per square inch.

Example 2

2.5 grams of the cyclohexylated diphenyl ether as in Example 1, and 2.5 grams of tributyl aconitate, to serve as a heat stabilizer, were incorporated with 20 milliliters of acetone. To this solution was added 45.0 grams of a co-polymer as in Example 1. The composition could easily be molded or extruded and filaments, having a diameter of 0.023 inch, prepared from this material were flexible glossy threads having a tensile strength above 37,000 pounds per square inch.

Example 3

5.0 grams of the cyclohexylated diphenyl ether as in Example 1, and 2.5 grams of tributyl aconitate were incorporated with 20 milliliters of acetone. To this solution was added 42.5 grams of a co-polymer as in Example 1. The composition could easily be molded or extruded and filaments having a diameter of 0.0215 inch, prepared from this material were flexible glossy threads and had a tensile strength above 28,000 pounds per square inch.

Example 4

2.5 grams of mono-cyclohexyl diphenyl ether, distilling at 200°–230° C. at 20 millmeters pressure and having a specific gravity of 1.0387 at 60°/60° C. and an index of refraction.

$$N_D^{25} = 1.5693$$

and which consisted of a mixture of the three mono-cyclohexyl-diphenyl ether isomers, and 2.5 grams of di-(alpha-phenyl-ethyl) ether, to serve as a heat stabilizer, were incorporated with 20 milliliters of acetone. To this solution was added 45.0 grams of a co-polymer as in Example 1. The composition could easily be molded or extruded and filaments having a diameter of 0.023 inch, prepared from this material were flexible glossy threads and had a tensile strength above 32,000 pounds per square inch.

Example 5

5.0 grams of the mono-cyclohexyl diphenyl ether as in Example 4 and 2.5 grams of 1,2-epoxy-3-(2-phenylphenoxy) propane, to serve as a heat stabilizer were incorporated with 20 milliliters of acetone. To this solution was added 42.5 grams of a co-polymer as in Example 1. The composition could easily be molded or extruded and filaments having a diameter of 0.015 inch, prepared from this material were flexible glossy threads with a waxy "handle" and had a tensile strength above 27,000 pounds per square inch.

Example 6

2.5 grams of a cyclohexyl diphenyl ether resin distilling at 310°–340° C. at one millimeter pressure and having a melting point of 50° C. and which consist of hexa-cyclohexyl diphenyl ether, and 5.0 grams of 1,2-epoxy-3-(2-phenylphenoxy) propane were incorporated with 20 milliliters of acetone. To this solution was added 42.5 grams of a co-polymer as in Example 1. The composition could easily be molded or extruded and filaments having a diameter of 0.012 inch prepared from this material were flexible glossy threads with a waxy handle and had a tensile strength above 43,000 pounds per square inch.

Example 7

3.0 grams of a cyclohexylated diphenyl ether resin distilling at 310°–340° C. at one millimeter pressure and having a melting point of 50° C., and 2.0 grams of a co-polymer consisting of 90 per cent vinylidene chloride and 10 per cent vinyl chloride, were placed in a test tube and heated to a fusion temperature. The product was a homogeneous brown colored brittle solid.

Example 8

4.5 grams of a cyclohexylated diphenyl ether distilling at 273°–300° C. under 20 millimeters pressure and having a specific gravity of 1.0307 at 60°/60° C., and an index of refraction.

$$N_D^{25} = 1.5662$$

and which correspond approximately to dicyclohexyl diphenyl ether, and 0.5 gram of a co-polymer as in Example 7 were heated to a fusion temperature. The product was a soft, sticky homogeneous paste.

Example 9

4.5 grams of mono-cyclohexyl diphenyl ether, distilling at 200°–230° C., under 20 millimeters pressure and having a specific gravity of 1.0387 at 60°/60° C. and an index of refraction $$N_D^{25} = 1.5693$$

and 0.5 gram of a co-polymer as in Example 7 were heated to a fusion temperature. The product was a homogeneous soft non-sticky greasy mass.

The compositions which contain relatively low proportions of the hydro-aromatic-substituted diaryl ethers have improved molding and extruding properties, while the compositions which contain relatively large proportions of the ethers will, depending upon the type of hydro-aromatic-substituted diaryl ether used, range from soft pastes to hard brittle masses. The latter compositions may be advantageously used in preparing improved lacquers, varnishes or paints.

The proportions of modifying agent to be employed in the new polymeric vinylidene chloride product compositions depends upon the hardness, toughness, strength and flexibility desired in the modified composition. For example, compositions for use in injection molding must flow well at molding temperatures but should harden rapidly at lower temperatures. They should be hard enough when cold to withstand scratching, and tough enough to withstand shock. Compositions for use in making thin films, foils, or filaments should have high flexibility at all temperatures met with in service and be sufficiently hard and tough to withstand abrasion. Similarly, lacquer coatings must be hard, tough and possess good flexibility. The exact proportions of the modifying agent to be employed in preparing the new compositions will vary with the use requirements, but may vary from about 0.5 per cent to about 90 per cent based on the weight of the polymeric vinylidene chloride product used. When it is desired to produce a composition which can be molded or extruded to form useful articles, threads, bands, filaments, foils, and the like which have a high tensile strength, good flexibility and resistance to abrasion, the amount of plasticizer will ordinarily vary from about 0.5 to about 40 per cent and more specifically between about 2 and about 20 per cent based on the weight of the polymeric vinylidene chloride product used. When, however, it is desired to produce a composition that is substantially more compatible with many of the commonly used lacquer solvents, the proportion of modifying agent may vary from about 15 to about 90 per cent.

While the above examples show the preparation of compositions from a polymeric vinylidene chloride product consisting of a co-polymer of 90 per cent vinylidene chloride and 10 per cent vinyl chloride incorporated with hydro-aromatic-substituted diphenyl ethers, other polymeric vinylidene products which have wide commercial value and which may be advantageously used in preparing the new compositions include the co-polymers containing from about 5 to about 30 per cent of vinyl chloride and correspondingly from about 95 to about 70 per cent of vinylidene chloride. Other co-polymers, in like proportions with vinylidene chloride, as included herein under the definition of the term, "polymeric vinylidene chloride product," form equally valuable compositions.

In preparing molded or extruded articles from the new polymeric vinylidene chloride product compositions at temperatures above the respective softening points, where the material is often maintained for a considerable period of time, it is desirable to have present in the composition a heat-stabilizing agent which acts to decrease or prevent thermal decomposition. A substance which will also prevent darkening on exposure to light is often desirable. Compounds applicable for these purposes include, 1,2-epoxy-3-(2-phenyl-phenoxy) propane, allyl-disulfide, 2-chloro-allyl-disulfide, 2,2'-dihydroxybenzophenone, tributyl aconitate, dipropyl maleate, 2-phenoxyethyl cinnamate, and di-(alpha-phenylethyl) ether.

The incorporation of minor amounts of coloring agents, fillers, plasticizers and the like has also been found to be useful and desirable when used in such amounts that the desirable mechanical properties of the product are not affected.

Other modes of applying the principle of my invention may be employed instead of those explained, change being made as regards the materials employed, provided the product recited in the following claims be obtained.

I claim:

1. A thermoplastic composition containing a co-polymer of from about 5 to about 30 per cent by weight of vinyl chloride and correspondingly from about 95 to about 70 per cent of vinylidene chloride, and from 0.5 to 90 per cent based on the weight of the co-polymer of a compound having the general formula:

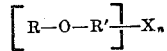

wherein R and R' each represent one aryl group selected from the class consisting of the phenyl, alkylphenyl, diphenyl and naphthyl radicals, X represents a hydro-aromatic radical selected from the class consisting of the cyclohexyl, dicyclohexyl, alkylcyclohexyl, and arylcyclohexyl radicals and $n$ represents an integer from 1 to 6, inclusive.

2. A thermoplastic composition comprising: (1) a polymeric vinylidene chloride product containing at least 70 per cent by weight of vinylidene chloride, and (2) from 0.5 to 90 per cent based on the weight of the polymer of a compound having the general formula:

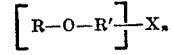

wherein R and R' each represents an aryl group selected from the class consisting of the phenyl, alkylphenyl, diphenyl, and naphthyl radicals; X represents a hydroaromatic radical selected from the class consisting of the cylclohexyl, dicyclohexyl, alkylcyclohexyl, and arylcyclohexyl radicals; and $n$ represents an integer from 1 to 6, inclusive.

3. A thermoplastic composition comprising: (1) a polymeric vinylidene chloride product containing at least 70 per cent by weight of vinylidene chloride, and (2) from 2.0 to 20 per cent based on the weight of the polymer of a compound having the general formula:

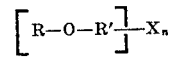

wherein R and R' each represents an aryl group selected from the class consisting of the phenyl, alkylphenyl, diphenyl, and naphthyl radicals; X represents a hydroaromatic radical selected from the class consisting of the cyclohexyl, dicyclohexyl, alkylcyclohexyl, and arylcyclohexyl radicals; and $n$ represents an integer from 1 to 6, inclusive.

4. A thermoplastic composition comprising a polymeric vinylidene chloride product containing at least 70 per cent by weight of vinylidene chloride and from 0.5 to 90 per cent based on the weight of the polymer of a cyclohexylated diphenyl ether wherein the number of cyclohexyl groups is from 1 to 6, inclusive.

5. A thermoplastic composition characterized by compatibility with many of the commonly used lacquer solvents comprising a polymeric vinylidene chloride product containing at least 70 per cent by weight of vinylidene chloride and from 15 to 90 per cent based on the weight of the polymer of a cyclohexylated diphenyl ether wherein the number of cyclohexyl groups is from 1 to 6, inclusive.

6. A thermoplastic composition, articles of which are characterized by high tensile strength, good flexibility, and resistance to abrasion, comprising a polymeric vinylidene chloride product containing at least 70 per cent by weight of vinylidene chloride and from 2.0 to 20 per cent based on the weight of the polymer of a cyclohexylated diphenyl ether wherein the number of cyclohexyl groups from 1 to 6, inclusive.

FRANK B. SMITH.